US009106441B2

(12) United States Patent
Schultze et al.

(10) Patent No.: US 9,106,441 B2
(45) Date of Patent: *Aug. 11, 2015

(54) METHOD AND APPARATUS FOR OPERATING AND IDENTIFYING CHANNELS OF A REDUNDANT COMMUNICATION NETWORK

(75) Inventors: Stephan Schultze, Lohr am Main (DE); Rigobert Kynast, Lohr am Main (DE); Ludwig Leurs, Lohr am Main (DE); Thomas Schmid, Hafenlohr (DE)

(73) Assignee: Bosch Rexroth AG, Stuttgart (DE)

( * ) Notice: Subject to any disclaimer, the term of this patent is extended or adjusted under 35 U.S.C. 154(b) by 1723 days.

This patent is subject to a terminal disclaimer.

(21) Appl. No.: 11/273,425

(22) Filed: Nov. 14, 2005

(65) Prior Publication Data
US 2006/0136604 A1 Jun. 22, 2006

(30) Foreign Application Priority Data
Nov. 16, 2004 (DE) .................. 10 2004 055 330

(51) Int. Cl.
| G06F 15/16 | (2006.01) |
| H04L 12/423 | (2006.01) |
| H04L 12/707 | (2013.01) |
| H04L 12/40 | (2006.01) |
| H04L 12/24 | (2006.01) |
| H04L 12/403 | (2006.01) |
| H04L 12/437 | (2006.01) |

(52) U.S. Cl.
CPC .............. *H04L 12/423* (2013.01); *H04L 12/24* (2013.01); *H04L 12/403* (2013.01); *H04L 12/40182* (2013.01); *H04L 41/00* (2013.01); *H04L 41/12* (2013.01); *H04L 45/22* (2013.01); *H04L 45/24* (2013.01); *H04L 12/437* (2013.01)

(58) Field of Classification Search
CPC ... H04L 45/22; H04L 45/24; H04L 12/40182; H04L 12/437; H04L 12/40132; H04L 41/00; H04L 41/12; H04L 41/08; H04L 41/80813; H04L 41/0816; H04L 49/351; H04L 69/40; G06F 11/2002; G06F 11/2005; G06F 11/2007
USPC .................. 709/208, 220, 224, 239; 370/403
See application file for complete search history.

(56) References Cited

U.S. PATENT DOCUMENTS

| 3,879,710 A | * | 4/1975 | Maxemchuk et al. | ......... 709/225 |
| 4,542,502 A | * | 9/1985 | Levinson et al. | ............. 370/403 |
| 4,742,484 A | * | 5/1988 | Yanai et al. | ................... 709/208 |

(Continued)

FOREIGN PATENT DOCUMENTS

EP  1 026 916  8/2000

OTHER PUBLICATIONS

Peter Lutz, Ethernet motion technology: The SERCOS interface, Jul. 2004, The Industrial Ethernet Book, Issue 21, pp. 1-11.*

(Continued)

*Primary Examiner* — Brian P Whipple
*Assistant Examiner* — Michael A Chambers
(74) *Attorney, Agent, or Firm* — Michael J. Striker

(57) ABSTRACT

A method for operating a redundant communication network with network participants includes the steps of determining by network participants to which network channels they are connected and using a telegram for said determining by the network participants to which network channels they are connected.

11 Claims, 1 Drawing Sheet

(56) References Cited

U.S. PATENT DOCUMENTS

| | | | |
|---|---|---|---|
| 5,023,778 A * | 6/1991 | Simon et al. | 709/209 |
| 5,826,038 A * | 10/1998 | Nakazumi | 709/251 |
| 6,298,061 B1 | 10/2001 | Chin et al. | |
| 6,430,151 B1 * | 8/2002 | Glas et al. | 370/222 |
| 6,594,232 B1 * | 7/2003 | Dupont | 370/224 |
| 6,704,849 B2 * | 3/2004 | Steegmans | 711/162 |
| 6,920,508 B1 * | 7/2005 | Muller | 709/251 |
| 7,009,995 B1 * | 3/2006 | Bohrer et al. | 370/460 |
| 7,142,504 B1 * | 11/2006 | Uzun | 370/224 |
| 7,272,635 B1 * | 9/2007 | Longtin et al. | 709/208 |
| 7,363,362 B1 * | 4/2008 | Friedman et al. | 709/223 |
| 7,451,230 B2 * | 11/2008 | Corrado et al. | 709/238 |
| 7,466,717 B1 * | 12/2008 | Weigl et al. | 370/451 |
| 7,995,489 B2 * | 8/2011 | Ayyagari | 370/252 |
| 2003/0177263 A1 * | 9/2003 | Robinson | 709/239 |
| 2006/0015607 A1 * | 1/2006 | Fava et al. | 709/224 |
| 2006/0031573 A1 * | 2/2006 | Feutz et al. | 709/238 |
| 2006/0079230 A1 * | 4/2006 | Russell | 455/434 |
| 2007/0189287 A1 * | 8/2007 | Schultze et al. | 370/389 |
| 2007/0192449 A1 * | 8/2007 | Schultze et al. | 709/220 |
| 2013/0018975 A1 * | 1/2013 | Higgins | 709/208 |
| 2014/0226459 A1 * | 8/2014 | Edmiston | 370/216 |

OTHER PUBLICATIONS

Peter Lutz "Ethernet Motion Technology: The SERCOS Interface" published in Jul. 2004, Industrial Ethernet Book Issue 21:30, pp. 1-11.*

Peter Lutz, Ethernet motion technology: The SERCOS interface, Jul. 2004, Industrial Ethernet Book Issue 21:30, pp. 1-11.*

Lutz ("Ethernet Motion Technology: The SERCOS Interface" published in Jul. 2004).*

Schemm, E.: :SERCOS to Link With Ethernet for IST Third IEE Computing & Control Engineering, Apr./May 2004, pp. 30-33 (Reference Is in English).

* cited by examiner

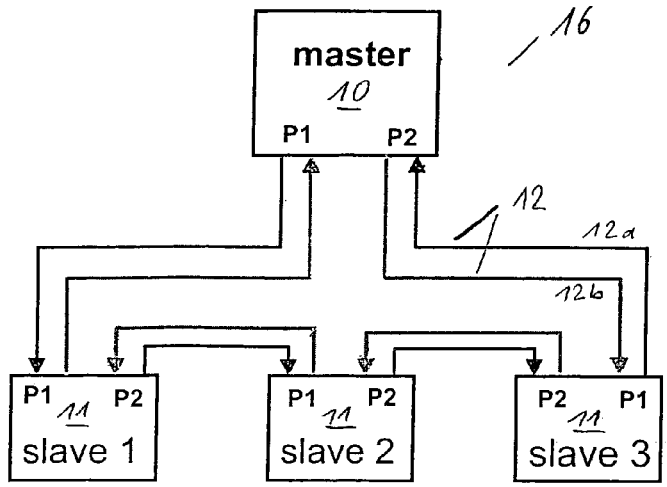
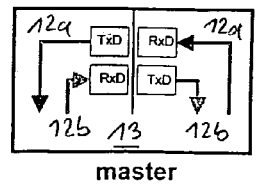
Fig. 1a
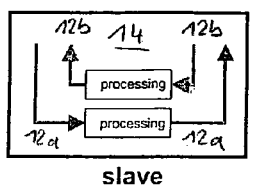
Fig. 1b
Fig. 1
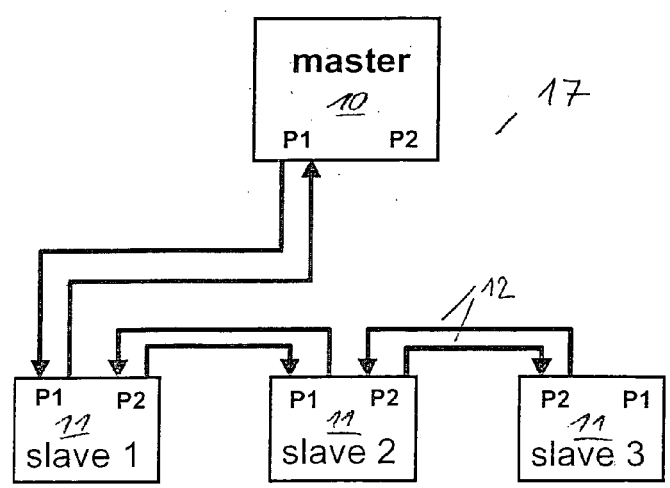
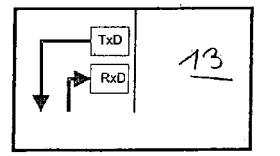
Fig. 2a
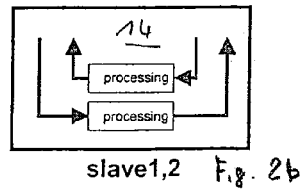
Fig. 2b
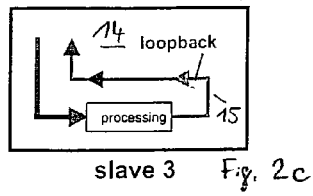
Fig. 2c
Fig. 2

METHOD AND APPARATUS FOR OPERATING AND IDENTIFYING CHANNELS OF A REDUNDANT COMMUNICATION NETWORK

BACKGROUND OF THE INVENTION

The present invention relates to data communications and deals with a method and a device for operating a network. The present invention also refers to a network with a corresponding data telegram.

Communication systems are known in the related art. Distributed communication systems, in particular, are utilized in many technical applications. Distributed communication systems are used, e.g., in automation systems based on decentralized control and drive system engineering, in which a large number of individual systems are often controlled and driven in a temporally synchronized manner. An example of a single system of this type is a drive unit, e.g., with a synchronous or asynchronous motor used to drive one of many axes that function in a manner such that they are mutually interpolating or closely interconnected. Typical fields of application of automation systems of this type based on decentralized control and drive system engineering are printing presses or machine tools, and robotic systems with a large number of conveying and operative elements that operate in a synchronized manner.

Communication systems of this type include at least two, but usually many more participants, which are preferably configured and/or arranged in a hierarchical structure, with one participant being configured as the central participant and the remaining participants being configured and/or arranged as further participants in the communication system. A hierarchical architecture is known, e.g., as a master-slave structure with the central or main participant as the "master" or "master participant" (main station), and the further participants as "slaves" or "slave participants" (substations or secondary stations). The main participant is designed as the central participant that generates and sends control signals to the further participants. The further participants are in communication contact with the central participant to receive these control signals and to communicate further with the central participant, as necessary, and they are typically in communication contact with the other participants as well. The slave participants are usually process interfaces, such as sensors and actuators, i.e., input/output assemblies for analog and digital signals, and drives. Signal processing, with data preprocessing, must be decentralized among the slave participants to keep the quantity of data to be transmitted low. This requires that the master participant and the further slave participants communicate with each other. In this regard, three basic architectures ("topologies") are known from the related art. The ring structure, in which a signal generated by the central participant travels around the ring and therefore passes each of the other participants in series.

The bus structure, with a central bus line to which the central participant and other participants are connected. The signal and data transfer is accomplished via a data bus in a known manner. When the central bus line has long paths, it is common to interconnect a "repeater" in the central bus line to amplify the signal. This is also practical with the ring structure, although the "repeater" is preferably realized within a participant in this case.

The third structure is a star architecture with a central switching participant (a "switch") integrated in the connecting line. A signal generated by the central participant is relayed via the switch to the participant specified as the receiver.

The three topologies described can also be part of a more complex system in which a plurality of basic architecture designs are realized in an interconnected manner. In this case, one of the central participants or a superordinate central participant has the task of generating a superordinate control signal.

Distributed communication systems are also known from the related art, with which the master function can be transferred among a plurality of participants or even among all participants. A requirement of "multi-master" systems of this type is that a plurality of participants have the functionality of a central participant and that they exercise this functionality when a defined condition exists. In this process, a participant that previously served as a further participant becomes the central participant, and the previous central participant becomes the further participant in the communication system. A possible condition for a transfer of this type can be, e.g., the absence of a control signal from the previous central participant.

The applicant currently offers a distributed communication system with a ring-type structure on the market, called the SERCOS Interface® (SErial Real Time COmmunication System). This system generates and sends control signals via a central participant to further participants. The further participants are typically connected with the central participant via optical waveguides. The SERCOS Interface® specifies strictly hierarchical communication. Data are exchanged in the form of data blocks, the "telegrams" or "frames", between the controller (master) and the substations (slaves) in temporally constant cycles. The further participants and/or substations do not communicate directly with each other. In addition, data contents are specified, i.e., the significance, depiction and functionality of the transmitted data are predefined to a significant extent. With the SERCOS Interface®, the connection of the controller with the ring is the master, and the connection of one or more substations (drives or I/O stations) is the slave. A plurality of rings can be linked to one controller, with the controller being responsible for coordinating the individual rings with each other. This is not specified by the SERCOS Interface®.

This communication system is used preferably for the closed-loop and open-loop control of distributed motors, e.g., synchronous or asynchronous motors. The further participants in the communication system are, therefore, the control devices for the closed-loop and open-loop control of a motor. The main applications for this communication system are, in particular, drives of machine tools, printing presses, operative machines, and machines used in general automation technology. With the SERCOS Interface® there are five different communication phases. The first four phases (phase 0 through phase 3) serve to initialize the participants, and the fifth phase (phase 4) is regular operation. Within one communication cycle, every substation exchanges data with the controller. Access to the ring is deterministic within collision-free transmission time slots. With the SERCOS Interface® there are three types of telegrams: Master Synchronization Telegrams, Amplifier Telegrams and Master Data Telegrams. Master Synchronization Telegrams (MST) are sent out by the master participant. They contain a short data field, are used to define the communication phase and serve as the "clock". Amplifier Telegrams (AT) are sent by slave participants and include, e.g., actual values of a drive controlled by the particular slave participant. Master Data Telegrams (MDT) are "big picture" telegrams that contain data fields for all slave participants.

The master uses Master Data Telegrams to transmit setpoint values to each slave. During initialization, every substation is notified of the start and length of its (sub-) data field. The SERCOS Interface® defines the following types of data, i.e., operating data, control and status information, and data transmitted in a non-cyclic manner. The operating data (process data) are transmitted in every cycle. Examples include setpoint values and actual values. The length of the operating data range is parameterizable. It is established during initialization and remains constant while the ring operates.

The control information transmitted by the master participants to the slave participants, and the status information sent by the slave participants to the master participants are release signals and "ready" messages, for example. Data transmitted in a non-cyclic manner (service channel) include setting parameters, diagnostic data and warnings. Command sequences are also controlled via this non-cyclic transmission. A communication cycle of the central participant is started via transmission of a MST. All communication-specific times are based on the end of this short telegram, which is approximately 25 μs in duration. The substations now send their Amplifier Telegrams (AT) in succession, in their respective transmission time slots. After the last AT, the master sends the MDT. The next cycle begins with another MST. The time interval between two MSTs is referred to as SERCOS cycle time.

With the SERCOS Interface®, communication is synchronized with the end of the MST. A synchronization telegram is generated by the central participant—preferably at equidistant intervals—and fed into the communication ring. In the closed-loop controllers, a time parameter typically links receipt of the synchronization telegram and the synchronization signal with the processing of setpoint/actual values, which results in a determination and allocation of open-loop and closed-loop parameters to the particular servo motors.

Since the secondary participants function as slaves and represent the connection of one or more substations (drives or I/O stations), it is often necessary in practice to reconfigure an existing network. This becomes necessary, e.g., when new components are to be added to an existing automation line and new participants must be integrated. In addition, "cabling" must be prescribed when the network channels are allocated in a fixed manner to ensure redundancy. The connections between the participants and the hardware side must be noted exactly. Faulty configurations can result in service interruptions with serious consequences, and expensive troubleshooting.

SUMMARY OF THE INVENTION

The object of the present invention, therefore, is to avoid the disadvantages of the related art and to find an easily expandable, easily-maintainable solution for a network of the type described initially.

The object is obtained with a method in which network participants autonomously determine, via telegrams, to which network channels they are connected. The secondary participants can therefore unambiguously allocate network channels to their communication ports.

The network mentioned initially is a redundant communication system. In this case, the same information is preferably exchanged between the network participants via at least two separate transmission paths (channels). The two channels can contain the same or different information, and are configured independently of each other. If a channel goes down (e.g., a cable breaks), the second channel serves as the back-up. If the network participants autonomously determine the way they are integrated in the network, then the method according to the present invention provides an intelligent network with which each participant can adapt its hardware and software in a dynamic manner to its particular external situation. This results in an improvement compared with the related art in terms of the reconfiguration and expansion of a network in particular. Susceptibility to error, e.g., due to channels being mixed up, is therefore also reduced, since the participants can autonomously configure their ports according to the hardware configuration, so that faults resulting from channel mix-ups never occur.

The network preferably includes at least one central participant and at least one secondary participant. The central participant can synchronize the secondary participants and, during an initialization phase, it can deliberately communicate with secondary participants via just one network channel and/or send telegrams to them. Via this communication, the secondary participants can unambiguously identify the channel via which the central participant is sending telegrams and assign it to one of its ports. This channel takes on the function of the primary channel, while the other channel can now also be unambiguously allocated and serves as the secondary channel during further operation.

Particularly preferably, telegrams with the same content are sent on all channels after the initialization phase. This creates redundancy. The telegrams could also contain different contents, of course, although redundancy would therefore not exist.

Very particularly preferably, the central participant sends a channel identifier for channel identification every time a new secondary participant is added. The channel identification is a data field in a telegram that permits identification of the channel being used, e.g., it therefore contains a channel number. The secondary participant evaluates this channel identification and, as a result, knows its connection to the network in terms of its ports. A brief example based on an automation network will be explained below. If a drive is integrated in the network as a secondary participant after the initialization phase, the drive would not easily recognize the primary and/or secondary channel assigned to its ports. In this case, the controller, as the central participant, characterizes the primary channel via a "hot plug-in field" in a telegram received from the drive, so the drive can unambiguously allocate the primary channel to one of its communication ports. The important point here is that channel identification takes place in an anti-cyclic manner and only when a new participant has been added.

The alternative possibility for a network participant to identify a network channel is given when at least one central participant and at least one secondary participant exist, the central participant sending telegrams with a channel identifier for channel identification in a cyclic manner or at least at regular intervals. Every secondary participant can then determine, at any time, i.e., also after the initialization phase, to which transmission channel (primary channel or secondary channel) which of its inputs is connected. This is an advantage, in particular, when a secondary participant is integrated subsequently in the network using a "hot plug-in". The previously-mentioned "hot plug-in field" that is inserted in an anti-cyclic manner is no longer required due to the cyclically-transmitted channel identifier. If connections are mixed up, the secondary participant can automatically and autonomously ensure correct allocation to the transmission channels used without additional effort and without losing any time. The network topology can also be easily determined in this manner. If a secondary participant receives the same type of telegrams at both communication interfaces and/or connections and/or ports, then it is situated in a line-type structure. If a secondary participant receives different telegram types at both connections, then it is situated in a ring-type structure.

The network advantageously has a ring-type topology. In this case, redundancy can be ensured easily on the hardware side, e.g., by using a double-ring system with rings moving in both directions. In this case, a first ring would represent the primary channel and a second ring would represent the secondary channel.

The object is also obtained with a device in which network participants have means for identifying the network channels and/or the network topology. The network participants are therefore enabled to configure themselves autonomously if connections are mixed up and to adapt to an existing network. Error analysis is enhanced by an autonomously-detected (see above) network topology.

The network preferably includes at least one central participant and at least one secondary participant and at least two channels, with a ring-type or line-type network topology being present. The central participant can serve as the master and the secondary participants can serve as slaves, the master taking on a leadership function. The ring-type topology makes it easier to obtain a redundant configuration, and the line-type topology results in material cost savings.

Particularly preferably, every participant has at least two communication interfaces, each with at least two connections, each connection performing either the function of an input and/or an output. This makes it possible to easily realize a P2P (peer to peer) structure between the participants, in particular between the secondary participants, so that each participant can also function as a "repeater" and forward data telegrams in an amplified and/or prepared manner. This variation also prevents negative consequences for the function of the network when the secondary participant connections are mixed up, since every secondary participant connection can receive and transmit data.

If a network is equipped with a device according to one of the device claims, it can automatically administrate network components.

The present invention is particularly advantageous when it is a network for automation purposes that includes at least one drive unit and one control unit. The advantage results from the flexible configurability.

A network of this type advantageously uses a data telegram that includes a subfield with channel information if the network uses more than one transmission channel. A data telegram with this structure makes it easier to realize a self-configuring system, and it supports "hot plug-in" solutions.

It is particularly recommended for the channel information to be included in the SERCOS® Master Data Telegram (MDT) and/or the SERCOS® Amplifier Telegram (AT) of the SERCOS Interfaces®. This interface is used preferably in automation technology.

The present invention will be described in greater detail below based on the description of a preferred exemplary embodiment, with reference to the attached drawings. In the drawing, the same reference numerals describe the same corresponding participants. All of the features described and/or depicted graphically represent the subject of the present invention, either alone or in any reasonable combination and, in fact, independently of their wording in the claims or their back-references. In the drawing:

BRIEF DESCRIPTION OF THE DRAWINGS

FIG. 1 is a schematic depiction of a redundant communication system with a ring structure, according to the present invention;

FIG. 1a is a detailed view of a first network participant;
FIG. 1b is a detailed view of a second network participant;
FIG. 2 is a schematic depiction of a communication system with a line-type structure, according to the present invention;
FIG. 2a is a detailed view of a first network participant;
FIG. 2b is a detailed view of further network participants;
FIG. 2c is a detailed view of a third network participant.

DESCRIPTION OF THE PREFERRED EMBODIMENTS

FIGS. 1 and 2 are based on a SERCOS® network 12 that includes a plurality of slaves 11 with integrated repeaters and a SERCOS Interface®, and at least one master 10, which also has a SERCOS Interface®. Communication between the network participants (master, slaves) is realized using point-to-point connections.

Every participant 10, 11 includes two communication connections, i.e., port P1 and port P2. Port P1 and port P2 are exchangeable, i.e., port P2 can take on the function of port P1, and port P1 can take on the function of port P2. In practice, this means the cables could be connected incorrectly at the ports without the correct functionality of the ports being affected.

The topology can be based either on a ring structure 16 (FIG. 1) or a line-type structure 17 (FIG. 2). A ring 16 always consists of two logical channels 12a, b. A line 17 always has only one logical channel.

Redundancy is achieved with a ring structure 16, because it includes a primary channel 12a and a secondary channel 12b, which usually transmits identical information. As a result, it is also easily possible to open ring 16 and integrate new participants during operation (hot plug-in).

Line-type structure 17, in contrast, consists either of a primary channel 12a or a secondary channel 12b. The physically last slave in line-type structure 17 is always connected using a loop-back function 15. This is illustrated in FIG. 2c using slave 3. Slave 3 uses only one of its ports P1 or P2, because there is no further slave 11 connected downstream of it. Slave 3 is therefore the last member in the chain.

FIG. 2a shows the use of ports P1/2 at master 10 in the line-type structure. In this case, either port P1 or port P2 is used to receive or send data. FIG. 2b shows that slave 1 and 2 each use either port P1 or P2 to forward received data using a logical channel.

In terms of the cabling of line-type structure participants 10, 11 compared with that of ring-type structure participants 10, 11, the difference is that both ports P1 and P2 of ring-structure master 10 are utilized, both ports being capable of simultaneously sending and receiving data. For example, master port 13 shown in FIG. 1a receives data using secondary channel 12b and sends data using primary channel 12a via its port P1. At the same time, it receives data using primary channel 12a and sends data using secondary channel 12b via its port P2. A ring-type structure slave 11 receives data—similar to a line-type structure slave 11—using primary channel 12a and sends data using secondary channel 12b via port P1. Using port P2, it receives data via secondary channel 12b and sends data using primary channel 12a via port P2. Line-type structure slave 11 number 3 is an exception. Refer to the description, above.

The following procedures according to the present invention are possible for correctly allocating the port connections of a participant to a channel in a ring structure. Master 10 transmits telegrams during initialization (phase 0 through 3) only on a logical channel 12a (primary channel) of network 12. Slaves 11 receive the telegrams at one of their two ports P1/2, depending on the connection to the network. The active slave connection is then assigned to the primary channel. After initialization, the master transmits telegrams with the same contents using both channels 12a, b. The slave connection that was not active previously is therefore logically assigned to the secondary channel.

As an alternative thereto, the master always characterizes the telegrams—independently of initialization—as primary telegrams for logical channel 12a, and as secondary telegrams for logical channel 12b, or vice versa. The characterization is located in a type field of the telegram. Every slave 11 can therefore determine, at any time, to which channels its ports connections are connected. This is very particularly significant when a slave 11 is integrated in the communication at a later point in time (hot plug-in). As a prerequisite to ensure reliable functionality, master 10 must retain a channel allocation that was selected.

The channel identifiers are preferably included in the SERCOS® header of the Master Data Telegram MDT or the Amplifier Telegram AT.

The network topology can also be detected as follows. If a slave 11 receives the same type of telegram (either primary channel or secondary channel telegrams) at both ports P1 and P2, this means it is integrated in a line-type structure 17. If the slave receives a primary channel telegram at one port P1/2 and a secondary channel telegram at the other port P2/1, it is integrated in a ring structure 16.

It will be understood that each of the elements described above, or two or more together, may also find a useful application in other types of constructions differing from the types described above.

While the invention has been illustrated and described as embodied in a method and device for operating a network, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A method for operating a redundant communication network with network participants, comprising the steps of:
   determining by network participants to which network channels they are connected;
   using a telegram for said determining by the network participants to which network channels they are connected;
   providing in the network at least one central participant and at least one secondary participant;
   providing a primary network channel and a secondary network channel;
   communicating between the central participant and the at least one secondary participant during an initialization phase via only said primary network channel, wherein said secondary network channel is not configured for and is never used for communicating between the central participant and the at least one secondary participant during the initialization phase;
   exchanging data in the form of telegrams between the central participant and the at least one secondary participant, wherein only after the initialization phase, the central participant transmits telegrams with the same contents using both the primary network channel and the secondary network channel;
   wherein the network is a redundant network configured as a network for automation purposes and includes at least one drive and one control unit, wherein said network is part of an automation system based on decentralized control and drive systems comprising a plurality of individual systems that are controlled and driven in a temporally synchronized manner.

2. A method as defined in claim 1; and further comprising sending telegrams on all channels after the initialization phase.

3. A method as defined in claim 2; and further comprising providing the telegrams on different channels having a same content.

4. A method as defined in claim 1; and further comprising transmitting by the central participant a channel identifier, in an anticyclic manner, for channel identification when a new secondary participant is added to the network.

5. A method as defined in claim 1; and further comprising including in the network at least one central participant and at least one secondary participant; and transmitting by the central participant telegrams with a channel identifier for channel identification.

6. A method as defined in claim 1; and further comprising utilizing by the network topology selected from the group consisting of a ring-type network topology and a line-type-network topology.

7. A device for operating a redundant communication network, comprising:
   network participants, wherein the network participants include means for identifying the network channels, wherein the participants include at least one central participant, at least one secondary participant, and at least two channels
   a network topology selected from the group consisting of a ring-type network topology and a line-type network topology being in place, the network participants comprising means for determining to which network channels they are connected, using a telegram for said determining, wherein communicating between the central participant and the at least one secondary participant during an initialization phase is via only a primary network channel, wherein a secondary network channel is not configured for and is never used for communicating between the central participant and the at least one secondary participant during the initialization phase, and wherein exchanging data is in the form of telegrams between the central participant and the at least one secondary participant, wherein only after the initialization phase, the central participant transmits telegrams with the same contents using both the primary network channel and the secondary network channel, and
   wherein the network is a redundant network configured as a network for automation purposes and includes at least one drive and one control unit, wherein said network is part of an automation system based on decentralized control and drive systems comprising a plurality of individual systems that are controlled and driven in a temporally synchronized manner.

8. A device as defined in claim 7, wherein each participant includes at least two communication interfaces, each with at least two connections, with each of the connections performing a function selected from the group consisting of an input function, an output function, or both.

9. A network with a device as defined in claim 7.

10. A data telegram for a network as defined in claim 9, wherein a subfield of the data telegram includes a channel identifier.

11. A data telegram as defined in claim 10, wherein it is configured as a data telegram that contains data fields for all slave participants and/or telegrams sent by slave participants that include actual values of a drive controlled by the particular slave participant.

* * * * *